(12) United States Patent
Koll

(10) Patent No.: US 8,707,910 B1
(45) Date of Patent: Apr. 29, 2014

(54) SURGICAL GARMENT DEVICE FOR A PET

(71) Applicant: Eileen Koll, Teaneck, NJ (US)

(72) Inventor: Eileen Koll, Teaneck, NJ (US)

( * ) Notice: Subject to any disclaimer, the term of this patent is extended or adjusted under 35 U.S.C. 154(b) by 0 days.

(21) Appl. No.: 13/919,427

(22) Filed: Jun. 17, 2013

(51) Int. Cl.
*A01K 13/00* (2006.01)

(52) U.S. Cl.
USPC .......................................... 119/850

(58) Field of Classification Search
USPC ........... 119/850, 856, 853; D30/145; 54/79.3, 54/79.4
See application file for complete search history.

(56) References Cited

U.S. PATENT DOCUMENTS

| | | | |
|---|---|---|---|
| 3,742,679 A * | 7/1973 | Jordan | 54/79.1 |
| 5,005,215 A * | 4/1991 | McIlquham | 2/22 |
| 5,137,508 A | 8/1992 | Engman | |
| 5,359,963 A * | 11/1994 | Jesse et al. | 119/850 |
| D368,338 S | 3/1996 | Levengood | |
| 6,481,383 B1 * | 11/2002 | Ross et al. | 119/850 |
| 6,499,438 B1 * | 12/2002 | Torres | 119/850 |
| 6,508,205 B1 * | 1/2003 | Zink | 119/850 |
| 7,464,668 B2 * | 12/2008 | Brewington | 119/869 |
| 7,793,619 B2 * | 9/2010 | Kajanoff | 119/850 |
| D634,901 S | 3/2011 | Cohen | |
| 8,015,948 B2 * | 9/2011 | Hall | 119/850 |
| D652,580 S | 1/2012 | Leonard | |
| 8,439,000 B1 * | 5/2013 | Mehtupciu-Ionescu | 119/868 |
| 2004/0031448 A1 | 2/2004 | Trepanier | |
| 2005/0034686 A1 | 2/2005 | Spatt | |
| 2009/0173290 A1 * | 7/2009 | Freitag | 119/850 |
| 2009/0183692 A1 | 7/2009 | Rossi et al. | |
| 2012/0174877 A1 | 7/2012 | Thompson | |
| 2013/0025542 A1 * | 1/2013 | Gutierrez | 119/600 |

* cited by examiner

*Primary Examiner* — Yvonne Abbott

(57) ABSTRACT

A surgical garment device for a pet prevents the pet from accessing wounds without otherwise restricting the pet's freedom of movement. The device includes a main section having a first lateral side and a second lateral side. A pair of first side openings is positioned in the first lateral side and a pair of second side openings is positioned in the second lateral side. Each of a plurality of leg coverings has an open top end removably coupled to an associated one of the leg coverings and an open bottom end opposite the top end wherein the leg coverings are configured for receiving legs of the pet when the leg coverings are worn by the pet. A plurality of connectors releasably couples the leg coverings to the main section.

19 Claims, 5 Drawing Sheets

SURGICAL GARMENT DEVICE FOR A PET

BACKGROUND OF THE DISCLOSURE

Field of the Disclosure

The disclosure relates to surgical garment devices and more particularly pertains to a new surgical garment device for preventing a pet from accessing surgical wounds without otherwise restricting the pet's freedom of movement.

SUMMARY OF THE DISCLOSURE

An embodiment of the disclosure meets the needs presented above by generally comprising a main section having a first lateral side and a second lateral side. A pair of first side openings is positioned in the first lateral side and a pair of second side openings is positioned in the second lateral side. Each of a plurality of leg coverings has an open top end removably coupled to an associated one of the leg coverings and an open bottom end opposite the top end wherein the leg coverings are configured for receiving legs of the pet when the leg coverings are worn by the pet. A plurality of connectors releasably couples the leg coverings to the main section.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
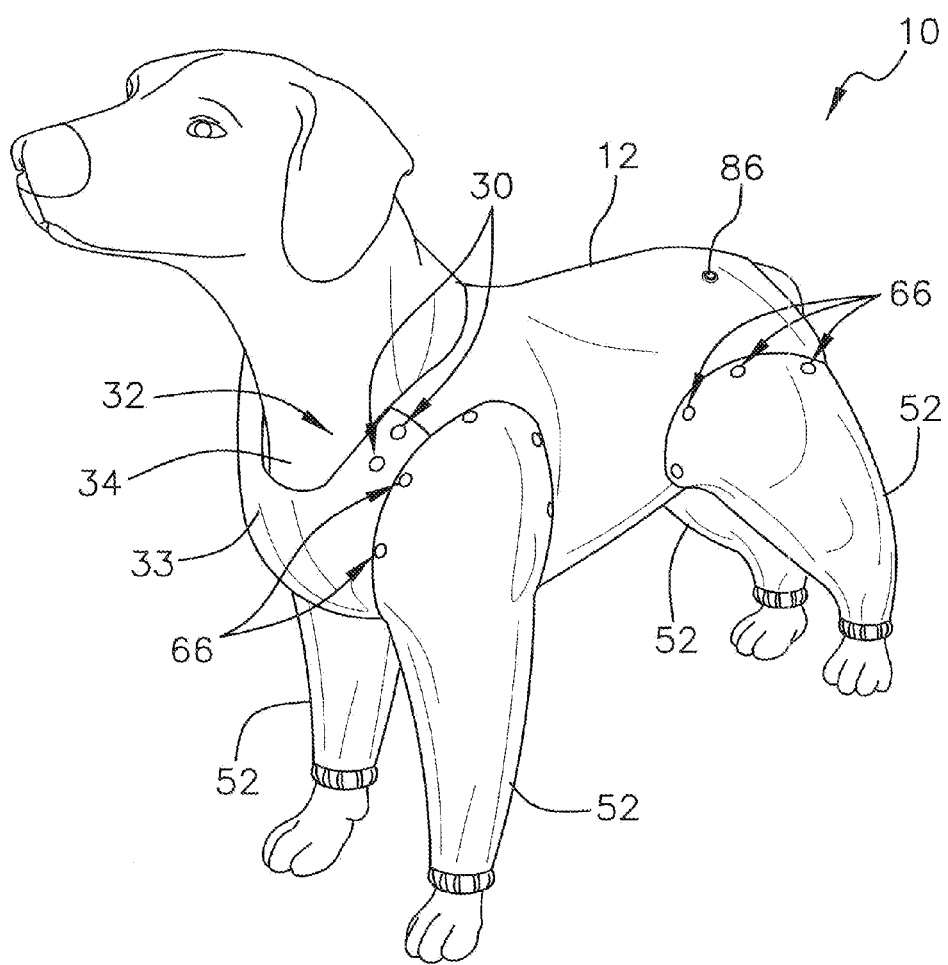
FIG. 1 is an in-use top front side perspective view of a surgical garment device for a pet according to an embodiment of the disclosure.
Figure 2:
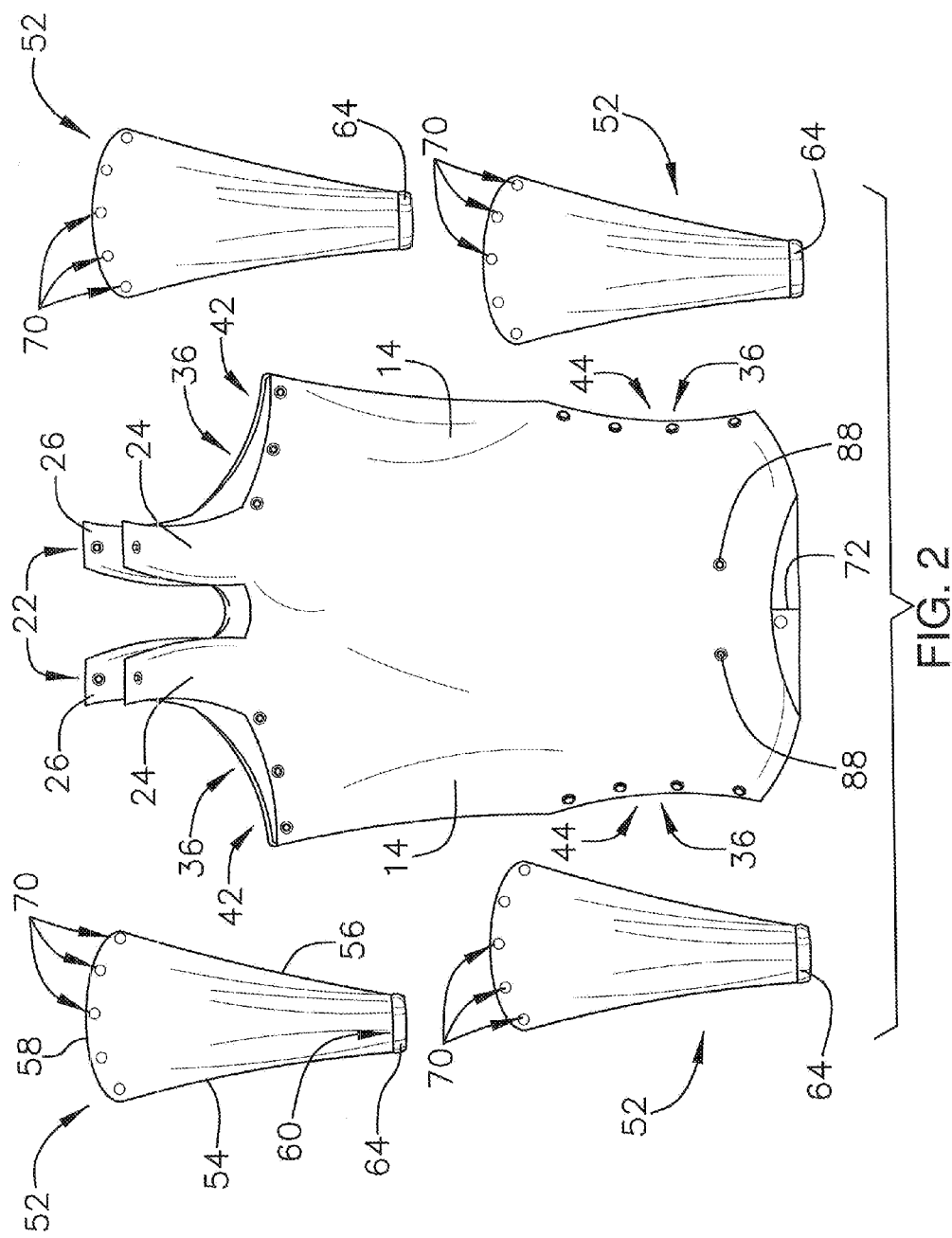
FIG. 2 is a top view of an embodiment of the disclosure.
Figure 3:
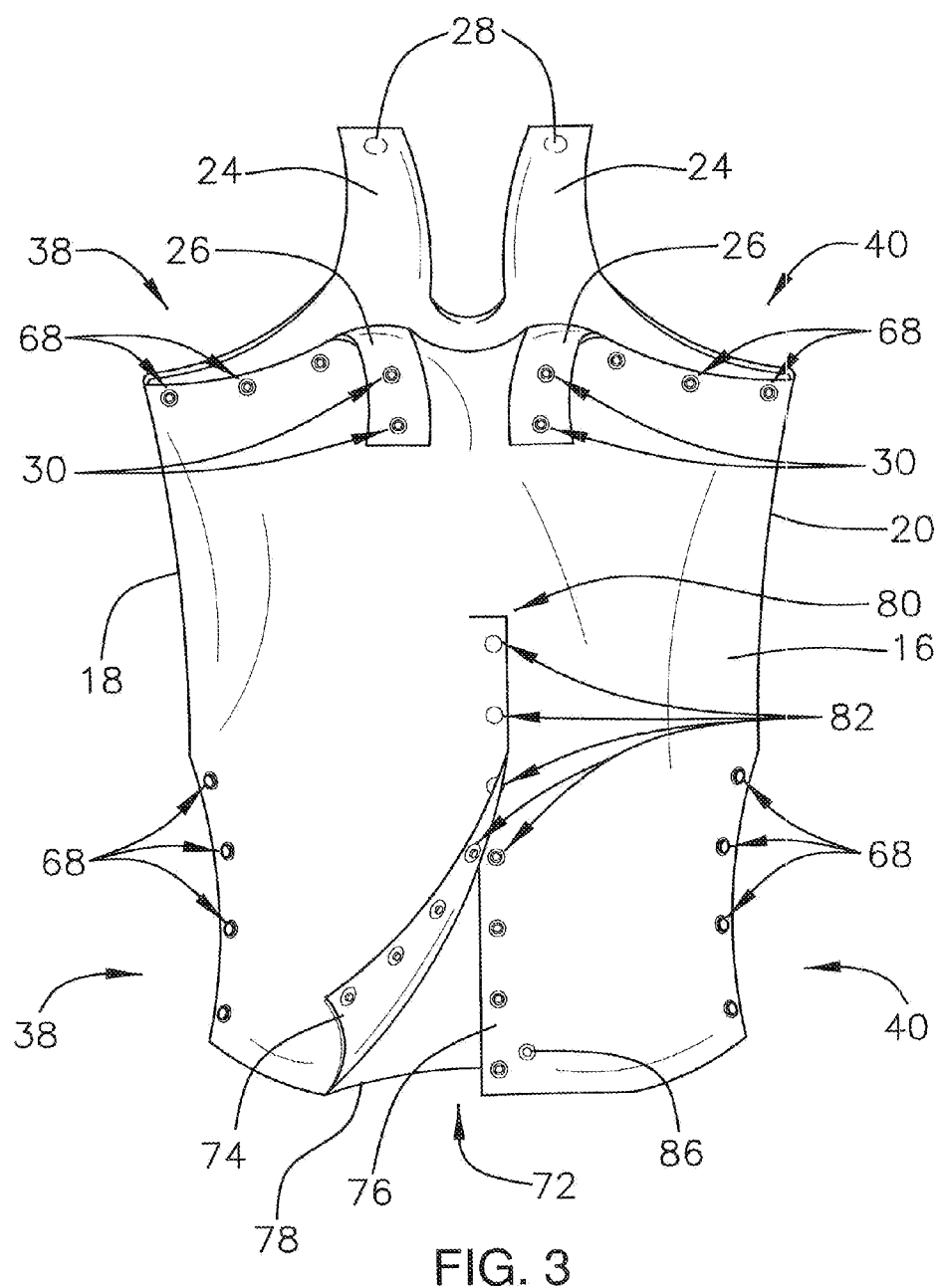
FIG. 3 is a bottom view of an embodiment of the disclosure.
Figure 4:
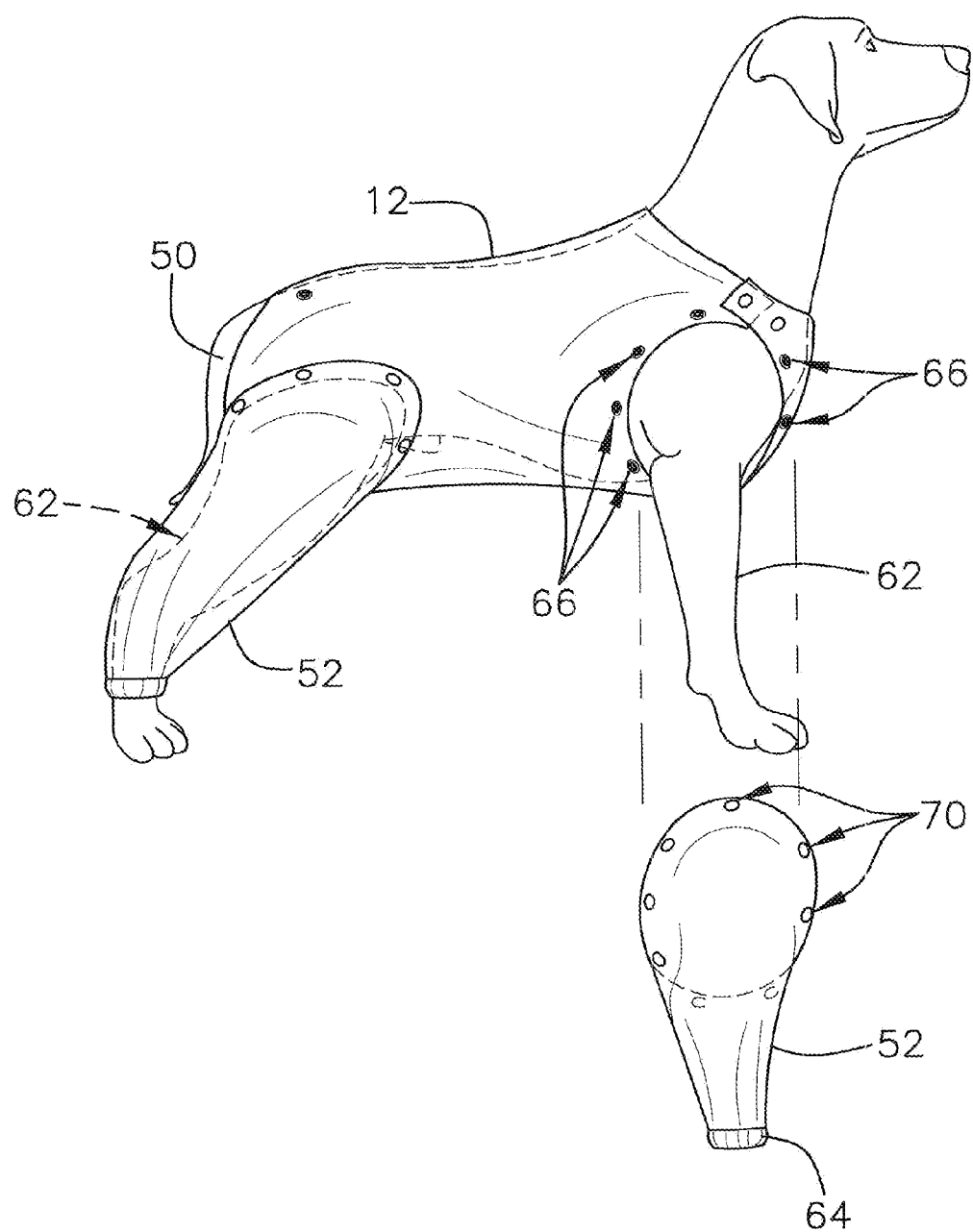
FIG. 4 is a partially-exploded side view of an embodiment of the disclosure.
Figure 5:
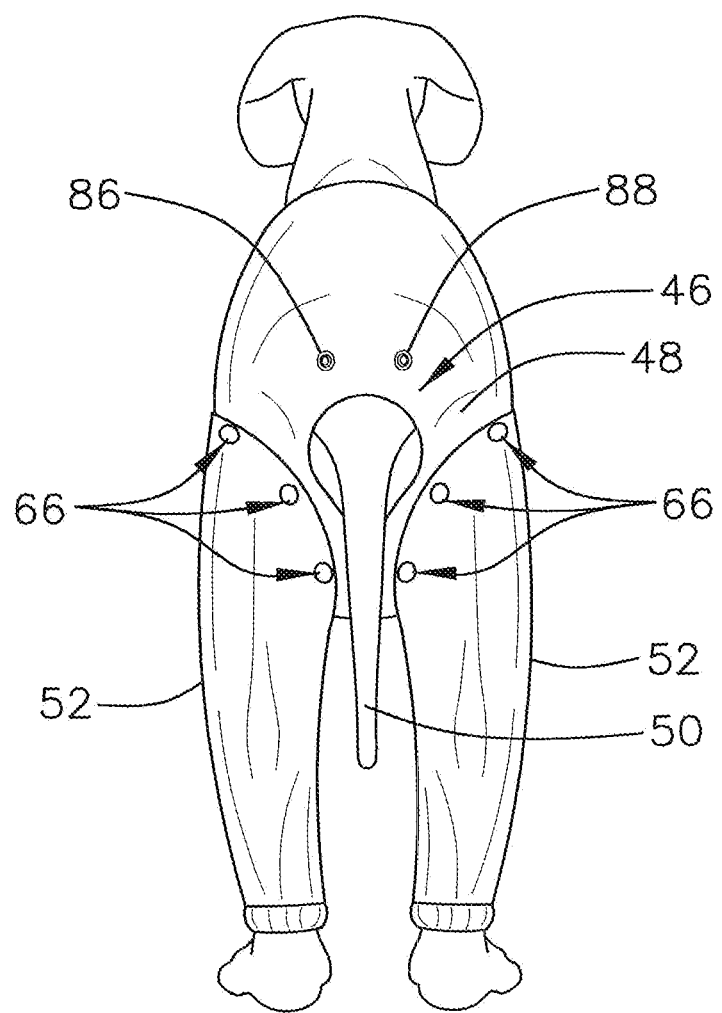
FIG. 5 is a back view of an embodiment of the disclosure.

With reference now to the drawings, and in particular to FIGS. 1 through 5 thereof, a new surgical garment embodying the principles and concepts of an embodiment of the disclosure and generally designated by the reference numeral 10 will be described.

As best illustrated in FIGS. 1 through 5, the surgical garment device for a pet 10 generally comprises a main section 12 having a top portion 14, a bottom portion 16, a first lateral side 18, a second lateral side 20, and a pair of shoulder straps 22. Each of the shoulder straps 22 may comprise a first portion 24 coupled to the top portion 14 of the main section 12 and a second portion 26 coupled to the bottom portion 16 of the main section 12. A first coupler 28 and a pair of second couplers 30 are preferably coupled to each of the shoulder straps 22. The first coupler 28 may be coupled to the top portion 14 of the main section 12, and the second couplers 30 may be coupled to the bottom portion 16 of the main section 12. A selectable one of the second couplers 30 is removably coupled to the first coupler 28 to permit adjustment of the device 10 to fit a size of the pet and prevent the device 10 from moving out of place when the device 10 is worn by the pet. Each of the second couplers 30 is preferably spaced and aligned. Each of the first coupler 28 and the second couplers 30 may comprise snaps, hook and loop fasteners, or the like.

A first opening 32 is positioned in the main section 12 and is defined by the shoulder straps 22. The first opening 32 extends into a front end 33 of the main section 12 wherein, the first opening 32 is configured for extending around a neck 34 of a pet when the main section 12 is worn by the pet. The first opening 32 is preferably equally spaced from the first 18 and second 20 lateral sides of the main section 12. A plurality of second openings 36 is positioned in the main section 12. The second openings 36 comprise a pair of first side openings 38 positioned in the first lateral side 18 and a pair of second side openings 40 positioned in the second lateral side 20. A front one 42 of each of the first 38 and second 40 side openings may extend further into the main section 12 than a back one 44 of each of the first 38 and second 40 side openings. A third opening 46 is positioned in the main section 12 and extends into a back end 48 of the main section 12 wherein the third opening 46 is configured to permit passage of a tail 50 of the pet therethrough when the main section 12 is worn by the pet. The third opening 46 is preferably equally spaced from the first 18 and second 20 lateral sides of the main section 12.

A plurality of leg coverings 52 is provided. Each of the leg coverings 52 has a first side 54, a second side 56, a top end 58, and a bottom end 60. The top end 58 is removably coupled to the main section 12, and the bottom end 60 is positioned opposite the top end 58. Each of the top 58 and bottom 60 ends is open wherein the leg coverings 52 are configured for receiving legs 62 of the pet such that the bottom ends 60c cover the legs 62 of the pet when the leg coverings 52 are worn by the pet. In this manner, the device 10 may extend from the neck 34 downwardly toward the hind legs of the pet. The top end 58 is preferably convexly arcuate. Each of the leg coverings 52 may taper inwardly from the top end 58 toward the bottom end 60. Each of the first side 54 and the second side 56 of the leg coverings is preferably arcuate. A band 64 may be coupled to each of the leg coverings 52 and extend around an associated one of the bottom ends 60 of each of the leg coverings 52. The bands 64 may be comprised of an elastomeric material to prevent the leg coverings 52 from sliding up the pet's legs 62.

A plurality of connectors 66 is provided. The connectors 66 comprise first connector portions 68 coupled to the main section 12 and second connector portions 70 coupled to the leg coverings 52. The connectors 66 releasably couple the first connector portions 68 to the second connector portions 70. In this manner, all, none, or only some of the leg coverings 52 may be coupled to the main section 12 at one time. The first connector portions 68 may be positioned around an entire circumference of each of the second openings 36. Likewise, the second connector portions 70 may be positioned around an entire circumference of the top ends 58 of the leg coverings 52. The connectors 66 may comprise snaps, hook and loop fasteners, or the like. The removable nature of the leg coverings 52 enables an owner to cover only those legs 62 of the pet that are wounded if so desired. Additionally, all of the leg coverings 52 may be removed when the pet is spayed or neutered.

A slit 72 extends into the bottom portion 16 of the main section 12. The slit 72 forms first 74 and second 76 overlapping sections of the main section 12. The slit 72 may be centrally positioned between the first 18 and second 20 lateral sides of the main section 12. The slit 72 may extend longitudinally from a back end 78 to a medial region 80 of the main section 12. A plurality of fasteners 82 is coupled to the first 74 and second 76 overlapping sections. The fasteners 82 releasably couple the first 74 and second 76 overlapping sections to each other. The fasteners 82 are preferably aligned along the first 74 and second 76 overlapping sections proximate the slit 72. The fasteners 82 may comprise snaps, hook and loop fasteners, or the like. The device 10 preferably includes between six and eight fasteners 82. The fasteners 82 permit the first 74 and second 76 overlapping sections to be released from each other so that the pet can relieve itself without having to remove the device 10.

A first mating member 86 and a second mating member 88 are provided. Each of the first 86 and second 88 mating members is spaced and positioned above the third opening 46. The first 86 and second 88 mating members are couplable to the fasteners 82 wherein the back end 48 of the bottom portion 16 of the main section 12 is positionable over the third opening 46 to expose a genital region of the pet when the first 86 and second 88 mating members are coupled to the fasteners 82 and the main section 12 is worn by the pet. Like the fasteners 82, the first 86 and second 88 mating members may comprise snaps, hook and loop fasteners, or the like.

In use, as stated above and shown in the Figures, the main section 12 is positioned on a torso of the pet such that the neck 34 of the pet extends out of the first opening 32, the legs 62 of the pet extend out of the second openings 36, and the tail 50 of the pet extends out of the third opening 46. The connectors 66 couple the leg coverings 52 to the main section 12 if desired such that all, some, or none of the leg coverings 52 are coupled to the main section 12 at one time. In this manner, an owner can prevent the pet from disturbing a wound on the pet's torso and/or on any, or all, of the pet's legs. The fasteners 82 are coupled to the first 86 and second 88 mating members when the pet needs to relieve itself so that the device 10 need not be removed from the pet's body.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A surgical garment device for a pet comprising:
  a main section having a first lateral side and a second lateral side, said main section having a top portion, a bottom portion, and a pair of shoulder straps, said shoulder straps comprising a first portion coupled to said top portion and a second portion coupled to said bottom portion;
  a plurality of second openings positioned in said main section, said second openings comprising a pair of first side openings positioned in said first lateral side and a pair of second side openings positioned in said second lateral side;
  a plurality of leg coverings, each of said leg coverings having a top end removably coupled to an associated one of said second openings and a bottom end positioned opposite said top end, each of said top and bottom ends being open wherein said leg coverings are configured for receiving legs of the pet when said leg coverings are worn by the pet such that said bottom ends cover the hind legs of the pet; and
  a plurality of connectors releasably coupling said leg coverings to said main section.

2. The device of claim 1, further comprising a first opening being positioned in said main section, said first opening being defined by said shoulder straps, said first opening extending into a front end of said main section wherein said first opening is configured for extending around a neck of the pet when said main section is worn by the pet, said first opening being equally spaced from said first and second lateral sides of said main section.

3. The device of claim 1, further comprising a first coupler and a pair of second couplers being coupled to each of said shoulder straps, said first coupler being coupled to said top portion of said main section, said second couplers being coupled to said bottom portion of said main section, a selectable one of said second couplers being removably couplable to said first coupler, said second couplers being spaced and aligned.

4. The device of claim 3, further comprising each of said first coupler and said second couplers comprising snaps.

5. The device of claim 1, further comprising a front one of each of said first and second side openings extending further into said main section than a back one of each of said first and second side openings.

6. The device of claim 1, further comprising a third opening being positioned in said main section, said third opening extending into a back end of said main section wherein said third opening is configured to permit passage of a tail of the pet therethrough when said main section is worn by the pet, said third opening being equally spaced from said first and second lateral sides of said main section.

7. The device of claim 1, further comprising each of said leg coverings having a first side and a second side, each of said first side and said second side of said leg coverings being arcuate.

8. The device of claim 1, further comprising each of said leg coverings tapering inwardly from said top end toward said bottom end, said top end of each of said leg coverings being convexly arcuate.

9. The device of claim 1, further comprising said connectors comprising first connector portions coupled to said main section and second connector portions coupled to said leg coverings, said connectors releasably coupling said leg coverings to said main section.

10. The device of claim 9, further comprising said first connector portions being positioned around an entire circumference of each of said second openings, said second connector portions being positioned around an entire circumference of said top ends of said leg coverings.

11. The device of claim 1, further comprising said connectors comprising snaps.

12. The device of claim 1, further comprising a band coupled to each of said leg coverings, each of said bands extending around an associated one of said bottom ends of each of said leg coverings.

13. The device of claim 12, further comprising said bands being comprised of an elastomeric material.

14. A surgical garment device for a pet comprising:
a main section having a first lateral side and a second lateral side;
a plurality of second openings positioned in said main section, said second openings comprising a pair of first side openings positioned in said first lateral side and a pair of second side openings positioned in said second lateral side;
a plurality of leg coverings, each of said leg coverings having a top end removably coupled to an associated one of said second openings and a bottom end positioned opposite said top end, each of said top and bottom ends being open wherein said leg coverings are configured for receiving legs of the pet when said leg coverings are worn by the pet such that said bottom ends cover the hind legs of the pet;
a plurality of connectors releasably coupling said leg coverings to said main section;
a slit extending into a bottom portion of said main section, said slit forming first and second overlapping sections of said main section; and
a plurality of fasteners coupled to said first and second overlapping sections, said fasteners releasably coupling said first and second overlapping sections, said fasteners being aligned along said first and second overlapping sections proximate said slit.

15. The device of claim 14, further comprising said slit being centrally positioned between said first and second lateral sides, said slit extending longitudinally from a back end to a medial region of said main section.

16. The device of claim 14, further comprising wherein said fasteners comprise snaps.

17. The device of claim 14, further comprising a first mating member and a second mating member, each of said first and second mating members being spaced and positioned above a third opening, said first and second mating members being couplable to said fasteners wherein a back end of a bottom portion of said main section is positionable over said third opening to expose a genital region of the pet when said first and second mating members are coupled to said fasteners and said main section is worn by the pet.

18. The device of claim 17, further comprising wherein said first and second mating members comprise snaps.

19. A surgical garment device for a pet comprising:
a main section, said main section having a top portion, a bottom portion, a first lateral side, a second lateral side, and a pair of shoulder straps, each of said shoulder straps comprising a first portion coupled to said top portion of said main section and a second portion coupled to said bottom portion of said main section;
a first coupler and a pair of second couplers being coupled to each of said shoulder straps, said first coupler being coupled to said top portion of said main section, said second couplers being coupled to said bottom portion of said main section, a selectable one of said second couplers being removably couplable to said first coupler, said second couplers being spaced and aligned, each of said first coupler and said second couplers comprising snaps;
a first opening being positioned in said main section, said first opening being defined by said shoulder straps, said first opening extending into a front end of said main section wherein said first opening is configured for extending around a neck of a pet when said main section is worn by the pet, said first opening being equally spaced from said first and second lateral sides of said main section;
a plurality of second openings positioned in said main section, said second openings comprising a pair of first side openings positioned in said first lateral side and a pair of second side openings positioned in said second lateral side, a front one of each of said first and second side openings extending further into said main section than a back one of each of said first and second side openings;
a third opening being positioned in said main section, said third opening extending into a back end of said main section wherein said third opening is configured to permit passage of a tail of the pet therethrough when said main section is worn by the pet, said third opening being equally spaced from said first and second lateral sides of said main section;
a plurality of leg coverings, each of said leg coverings having a first side, a second side, a top end removably coupled to said main section, and a bottom end positioned opposite said top end, each of said top and bottom ends being open wherein said leg coverings are configured for receiving legs of the pet when said leg coverings are worn by the pet such that said bottom ends cover the hind legs of the pet, said top end being convexly arcuate, each of said leg coverings tapering inwardly from said top end toward said bottom end, each of said first side and said second side of said leg coverings being arcuate;
a plurality of connectors, said connectors comprising first connector portions coupled to said main section and second connector portions coupled to said leg coverings, said connectors releasably coupling said leg coverings to said main section, said first connector portions being positioned around an entire circumference of each of said second openings, said second connector portions being positioned around an entire circumference of said top ends of said leg coverings, said connectors comprising snaps;
a band coupled to each of said leg coverings, each of said bands extending around an associated one of said bottom ends of each of said leg coverings, said bands being comprised of an elastomeric material;
a slit extending into said bottom portion of said main section, said slit forming first and second overlapping sections of said main section, said slit being centrally positioned between said first and second lateral sides, said slit extending longitudinally from a back end to a medial region of said main section;
a plurality of fasteners coupled to said first and second overlapping sections, said fasteners releasably coupling said first and second overlapping sections, said fasteners being aligned along said first and second overlapping sections proximate said slit, said fasteners comprising snaps; and
a first mating member and a second mating member, each of said first and second mating members being spaced and positioned above said third opening, said first and second mating members being couplable to said fasteners wherein said back end of said bottom portion of said main section is positionable over said third opening to expose a genital region of the pet when said first and second mating members are coupled to said fasteners and said main section is worn by the pet, said first and second mating members comprising snaps.

* * * * *